3,502,044
APPARATUS FOR OPERATING TOOLS IN ACCORDANCE WITH A PREDETERMINED PROGRAMME
Philip Brown, 31 Princes Court, Wembley, Middlesex, and Peter Henry James, 9 Adamsrill Road, Sydenham, London, SE. 26, both of England
Filed May 10, 1967, Ser. No. 637,581
Claims priority, application Great Britain, May 16, 1966, 21,686/66; July 19, 1966, 32,343/66
Int. Cl. D05c 15/12, 11/06
U.S. Cl. 112—79    11 Claims

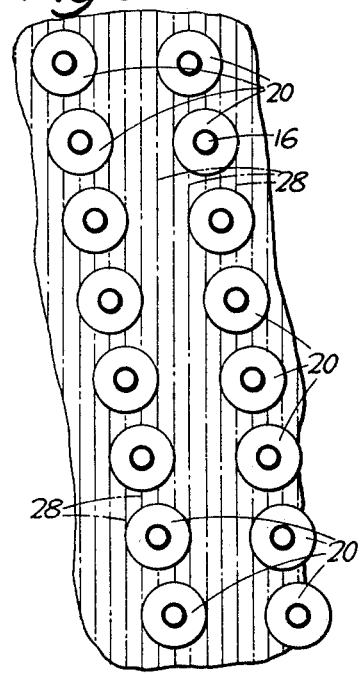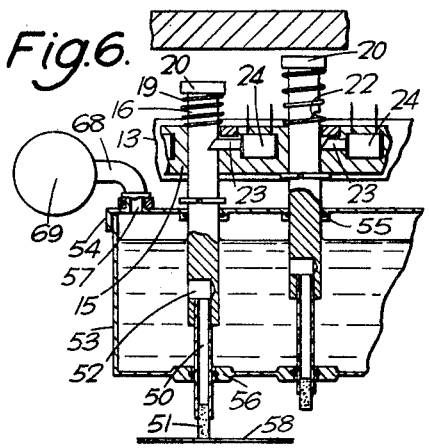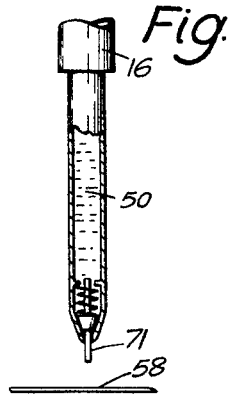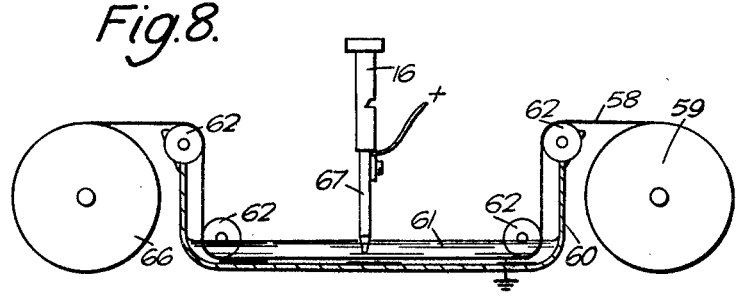

ABSTRACT OF THE DISCLOSURE

An apparatus for selectively reciprocating a multiplicity of tools, for example needles in a carpet tufting machine, in relation to the material to be worked, comprises an assemblage of tool holders extending across the material; means for traversing the material across the tool holders; means for imparting movement independently to any of said tool holders in a direction towards and away from the material so that the material is worked by the tools, for example the needles form tufts in the material and a programmer which ensures that the tool holders are moved in a required sequence.

---

Figure 1:
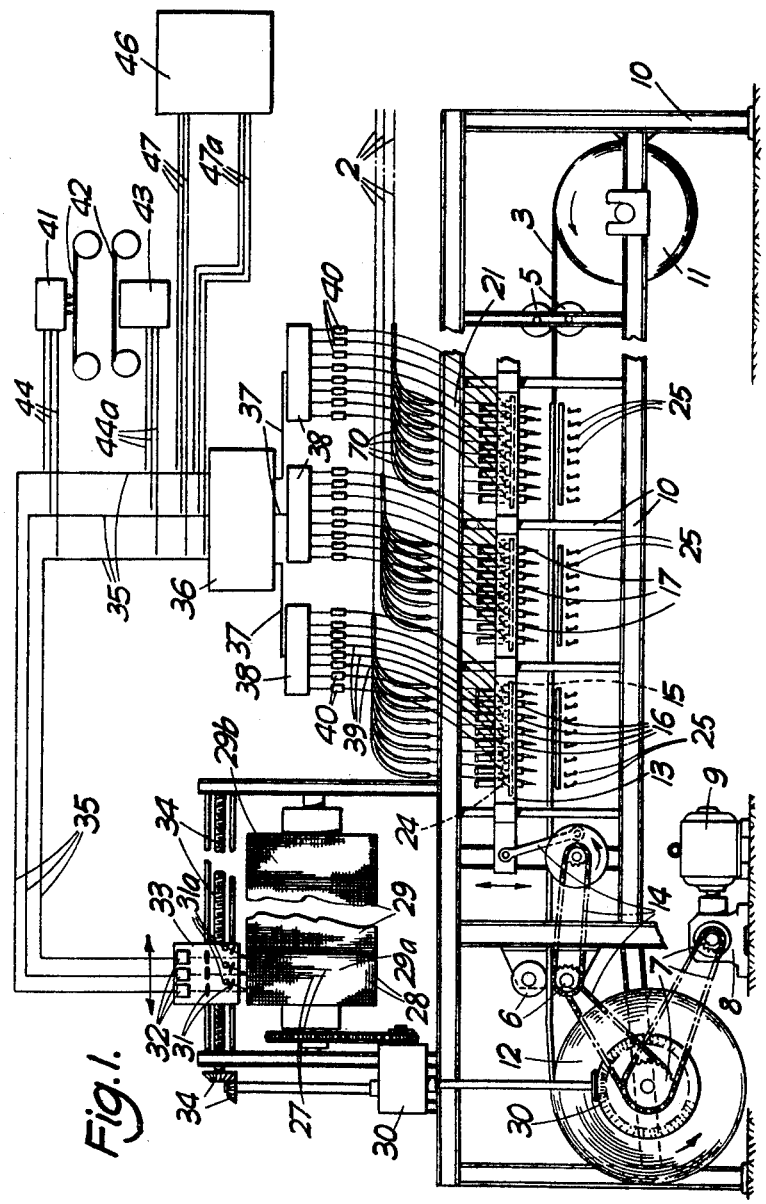

This invention relates to an apparatus of the kind which operates upon material with reciprocable or oscillatable tools in accordance with a predetermined programme and particularly, but not exclusively, to apparatus for making tufted carpets. An object of the invention is to provide an apparatus which can conveniently produce a wider range of patterns than heretofore.

According to this invention an apparatus of the kind referred to comprises an assemblage of tool holders extending across the material to be operated upon, means for effecting relative movement between said material and assemblage in a direction along the material, means for imparting relative movement independently to any of said tool holders and the material in a direction towards and away from the material so that the material is worked and a programmer, for conditioning said latter means so that the tool holders are operated in a required sequence.

The aforesaid programmer may comprise a pattern representing the material in its required finished form and a scanner of the pattern which successively traverses or is traversed by portions of the pattern in a direction corresponding to the direction in which the tool holders extend across the material thereby producing a succession of signals for each traverse, means responsive to said signals which either condition directly means controlling reciprocation or oscillation of said tools or which condition a computer or magnetic or perforated tape with which are associated means for subsequently controlling the reciprocation or oscillation of said tools.

The scanner is preferably of the optical kind.

Means may be provided for converting the varying light signals resulting from the optical scanner into electric signals which are fed to means which either actuate directly the means for controlling the reciprocation or oscillation of said tools or condition a computer or magnetic or perforated tape with which is associated means for subsequently controlling reciprocation or oscillation of said tools.

As an alternative to a pattern and a scanner therefore the programmer may comprise a computer which is adapted to be conditioned in accordance with the required finish to be applied to the material by said tools and so as to generate a succession of signals, means responsive to said signals which either actuate directly means for controlling the reciprocation or oscillation of said tools or which condition a magnetic or perforated tape with which are associated means for reciprocating or oscillating said tools.

In any of the above arrangements means may be provided for simultaneously moving only those tools which are to perform an operation on the work to a sufficient extent to perform that operation.

In such an arrangement there may be provided a continuously reciprocating member and means controlled by said signals for coupling to that member only those tools which are to perform an operation.

Means may be provided for moving all the tools simultaneously to a sufficient extent to bring them close to the material to be operated upon and wherein means are provided for applying additional movement to only those tools which are required to operate upon the material.

In such an arrangement there may be provided a tool carrying frame which extends across the width of the material and mechanical means are provided for reciprocating the frame towards and away from the material in synchronism with the rate of travel of the material through the apparatus and wherein means are provided for coupling the tool holders to the frame or to a removable bar or panel in said frame.

The frame may be provided with a number of locating means spaced apart in the direction of travel of the material each of which locating means is capable of receiving a bar or panel in which the tool holders are reciprocably mounted and are spaced apart across the width of the material.

Each said tool holder may be provided with stops for limiting the reciprocable movement of the holder in said bar or panel and with a notch in one side thereof and wherein spring means is associated with each holder so as to urge it relatively to the bar or panel in which it is mounted in a direction away from the work and towards one limit of its travel in said bar and wherein latch means are provided for retaining the holder at the last said limit of its travel in said bar and a fixed abutment disposed in the path of movement of that end of each tool holder remote from the work so that when the frame reaches the limit of its travel away from the work the notches in the tool holders are brought opposite the latches and means for selectively operating said latches.

In the case where the apparatus is employed for manufacturing tufted material the tufting needles may be mounted in said holders and movement imparted simultaneously to the holders for the needles which are to perform tufting to a sufficient extent to bring the yarn in those needles opposite means adapted to engage the yarn so that when the movement of the needles is reversed loops are formed.

All those needles in a frame or in a bar or panel in the frame which are to effect tufting may be simultaneously moved to bring the yarn opposite the means which engage the yarn.

Means may be provided for imparting movement to the other needles in said frame or bar or panel so as to pierce the fabric but to stop short of the means for engaging the yarn.

In the case where the apparatus is employed for reproducing coloured pictures there are provided a number of reservoirs for different coloured inks or paints arranged side by side in the direction of travel of a sheet disposed beneath them which reservoirs extend a line of small diameter tubes which constitute said tools and holder which project above the top of the reservoir whereas the lower ends of the tubes project through the bottom of the reservoir, the lower end of each of which tubes is either provided with a pad or small nozzle and which tubes within the reservoir are provided with small openings for receiving the ink or paint, the movement of which holders towards and away from the sheet is controlled in the manner set out above.

In the case where the apparatus is employed for depositing metal on sheet material there is provided a reservoir for molten metal or suspension of metal particles through which reservoir extends a line of small diameter tubes constituting said tools, holders for which project above the reservoir, the lower end of each of which tubes project below the bottom of the reservoir and is provided with a small nozzle and which tubes within the reservoir are provided with small openings for receiving the metal, the movements of which holders towards and away from the sheet is controlled in the manner set out above, and means for selectively controlling the flow of metal through the nozzles.

Means may be provided for pressurizing the reservoir so as to eject the ink, paint or metal from the aforesaid small tubes.

The apparatus may also be employed for effecting spark erosion for cutting the metal, in which case each tool comprises an electrode which when brought close to a sheet results in a passage of a spark and each of which electrodes could be connected to a generator of high voltage which is conditioned by a signal generated in any of the ways referred to above.

Finally the apparatus may be employed for welding together plastics material along predetermined lines in which case the tools comprise electrodes connected to the source of high frequency electric current so that when successive needles are brought into contact with superimposed parts of plastic the sheets will be welded along predetermined lines in accordance with lines on a pattern.

Figure 2:
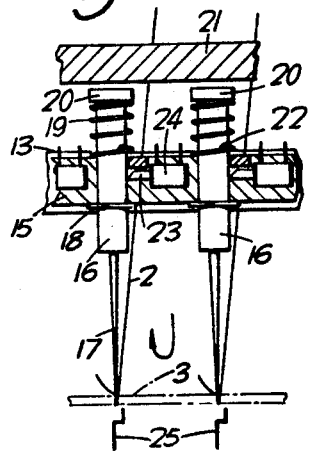
Figure 3:
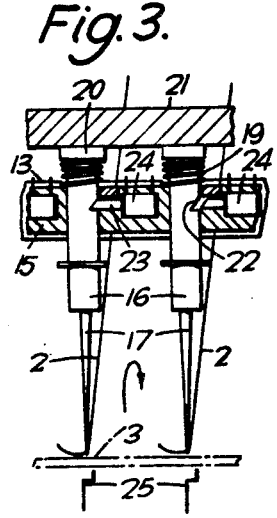
Figure 4:
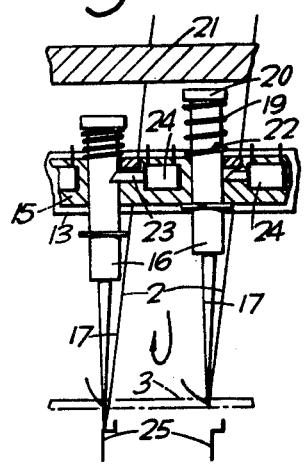

Several embodiments of the invention are now described with reference to the accompanying diagrammatic drawings in which:

FIGURE 1 is a side elevation of a fabric tufting apparatus in which needles are controlled either by signals from a scanner, or a punched tape or a computer, FIGURES 2, 3 and 4 show the positions of the needles and needle holders during one reciprocation of the needle carrying bar one of which needles is rendered operative for forming a tuft and the other is maintained inoperative.

FIGURE 5 is a diagrammatic plan view of certain of the needle holders in one of the bars, FIGURE 6 is a part section view of a bar having tool holders for paint, ink or metal particles in suspension, FIGURE 7 is a sectional view of a tool holder for use in the apparatus shown in FIGURE 6, FIGURE 8 is a diagrammatic view of an apparatus for cutting holes or perforations in metal strip by spark erosion.

The apparatus comprises a structural framework 10 towards the bottom of which there are mounted supply and take-up rolls 11 and 12 for the fabric being tufted. A motor 9 drives the take up roll 12 through a gear box 8 and chain and sprocket transmission 7 so that the fabric is traversed continuously and slowly between them.

A needle carrying frame 13 is mounted in the structural framework above the fabric so as to be reciprocable in an up and down direction at a predetermined rate in accordance with the continuous movement of the fabric, a suitable transmission 14 being provided for that purpose which is driven from the shaft of the take up roll as shown in FIGURE 1. The tufted carpet passes between driven nip rolls 6 on its way to the take up roll and similarly the fabric passes between nip rolls 5 on its way to the needle carrying frame 13. The frame 13 is provided with locating means for a number of needle carrying bars or panels 15 which extend across the width of the fabric 3, the number of bars or panels 15 corresponding to the number of colours required for the tufts which are to be introduced into the fabric 3 being shown in the drawing. The needle bars or panels are spaced apart in the direction of travel of the fabric. The bars or panels may be formed in one piece or in a number of pieces arranged end to end across the width of the fabric. Each bar or panel carries a number of holders 16 for needles 17 with each of which is associated means for bringing the needles into and out of operation. Different coloured yarns 2 are drawn from sets of creels, there being one set for each colour of yarn and each set containing as many creels as there are needles in a bar or panel for any particular colour of yarn, and the yarns pass through guide tubes 70 on their way to the needles. There may be as many as 1000 needles spaced apart across the width of the fabric for each colour. Thus during tufting of the fabric up to 1000 needles for each colour may require to have tufting movement imparted to them.

Each needle holder 16 is vertically slidable in one of the vertically reciprocable bars or panels 15. Each holder has secured to it a collar 18 (see FIGURE 2) beneath the bar or panel 15 and is encircled by a compression spring 19 above the bar or panel. One end of the spring abuts the bar or panel, the other end abuts a head 20 on the holder. A stationary stop plate 21 is disposed in the path of movement of all the heads of the needle holders. Each holder has a notch 22 formed on one side thereof which is engageable by a latch 23 which is reciprocable in the bar or panel 15 at right angles to the direction of reciprocation of the holder. The latch constitutes the core of a solenoid the coil 24 of which may be energisable in opposite senses so that the latch may be moved in either direction. Disposed beneath the fabric 3 and opposite each needle is a tufting hook 25 or like yarn engaging mechanism which engages the yarn 2 in the needle so that as the needle is withdrawn a loop is formed on the underside of the fabric. The engagement of the yarn 2 with a hook 25 is determined by the distance which the needle carrying that yarn is projected below the fabric and this is determined by whether or not a latch 23 has been engaged with a notch 22 in the holder 16 of that needle.

In FIGURE 2 both solenoid coils 24 of adjacent needle holders 16 have been energised in a direction to withdraw the latches 23 and the needle carrying bar or panel 15 is at the bottom of its travel. The springs 19 have moved the holders 16 upwardly in relation to the bar or panel 15 and under these conditions the needles 17 just penetrate the fabric 3.

In FIGURE 3 the bar or panel 15 has risen to the upper limit of its travel carrying with its all the holders and when their heads engage the stop plate 21, compressing the springs, the ends of the needles are just above the fabric. The solenoid coil 24 for the first latch 23 has been energised in the opposite sense to that shown in FIGURE 2 so that the latch 23 is urged into the notch 22 in the needle holder 16 whereas the solenoid coil 24 for the other latch 23 has remained energised in the same sense.

In FIGURE 4 the bar or panel 15 has again descended to its lowest limit of travel and it will be seen that the latched needle 17 which is now coupled to the bar or panel 15 has travelled a greater distance through the fabric 3 as compared with the unlatched needle 17 which is not moved downwardly until the bar has moved sufficiently for the collar 18 to be engaged on the underside of the bar and the needle is then projected into the fabric so as to hold it substantially stationary during tufting by the latched needle. The latched needle has been projected a sufficient distance beneath the fabric 3 for the yarn 2 to be engaged by the tufting hook 25, and thus when the needle again rises the loop is formed.

It will therefore be seen that the formation of a loop in the yarn 2 is determined by whether or not a solenoid coil 24 has been energised in a sense to bring a latch 23 into engagement with a notch 22 in a needle holder 16.

Owing to the bulk of the needle holders 16 it is not possible to arrange them sufficiently close together side by side across the width of the fabric to form the required spacing of the tufts in a line across the fabric. The needle holders associated with each bar or panel 15 require to be disposed in staggered relationship in each of a number of columns, two of which columns are shown in FIGURE 5, there being eight holders in each column. Thus in the event of 1000 needles being required, 125 columns are provided. In FIGURE 1 there is shown one such column of eight in each bar or panel. As the fabric moves through the apparatus rows of tufts are formed extending across the width of the fabric.

The required sequence of rendering the various needles operative is now described with reference to FIGURE 1.

The apparatus comprises a rapidly rotating cylinder 29 which carries a coloured representation of the pattern which is required for the tufted fabric and means 30 are provided in known manner for rotating the cylinder from the aforesaid transmission 7 in synchronism with the movement of the fabric 3. For the purposes of explanation there is drawn on this pattern axially spaced lines 27 encircling the cylinder which represent the lines of tufts across the width of the fabric and circumferentially spaced axially extending lines 28 representing the rows of tufts extending along the length of the carpet. A number of optical scanners one for each of the differently coloured tufts to be formed are supported on a carriage 33 and are spaced apart in the direction of the axis of the cylinder by an amount proportional to the spacing apart of the needle carrying bars or panels 15 along the length of the fabric 3. Means 34 are provided for traversing the carriage 33 axially along the cylinder at a rate proportional to the rate of travel of the fabric 3 which means 34 may be driven from the aforesaid transmission 30. The optical scanner comprises in known manner a number of lens systems 31 for focussing a beam of light, the colour of which varies with the colour of the pattern which pattern is illuminated by light sources 31a as the lens systems traverse across the pattern. The beam of light from each lens system is directed on to a photo-electric cell 32 disposed opposite the lens system and travelling with the lens system and which photo-electric cell is responsive to a particular colour in the pattern which is to be represented by coloured tufts in the carpet. Thus as each lens system 31 comes opposite a colour to which its associated photo-electric cell 32 is responsive an electric impulse is generated. The resulting succession of electrical impulses from each photo-electric cell is transmitted along a conductor 35 to an instep maintenance device 36 having the same number of outputs to said conductors and each of which outputs is connected by a conductor 37 to an integrated circuit system 38, each of which is associated with one of the aforesaid needle carrying bars or panels 15 and has the same number of outputs 39 as needles and are connected through amplifiers 40 to the respective solenoid coils 24 to operate the needles 17 in the manner described above. The integrated circuit system includes a solid state switching device to ensure that as an impulse is generated by a photo-electric cell 32 when its lens system 31 is opposite a colour at a particular location on the pattern a tufting needle 17 for that particular colour and opposite a corresponding location on the fabric 3 is rendered operative.

Thus as the cylinder 29 rotates and each lens system 31 and photo-electric cell 32 successively pass locations where the colour corresponds to the colour to which the cell is responsive a succession of needles 17 across the width of the fabric are rendered operative forming a line of tufts across the width of the carpet. During this time the lens systems 31 and cells 32 are travelling slowly along the rapidly rotating cylinder 29 and should it be required to repeat the pattern when said cells reach the end of the cylinder their direction may be reversed by a reversing mechanism not shown and brought back to their initial position and the process repeated.

Since the needle carrying bars 15 which extend across the width of the fabric are spaced apart along the length of the fabric 3 a full line of tufts across the fabric will not be completed until the line has moved past all the bars. Thus in order to prevent incomplete lines of tufts being formed at the leading or the trailing ends of the fabric means (not shown) require to be provided so that at the commencement of tufting the needles on the various bars are rendered successively operable and at the end of tufting they are successively rendered inoperative.

In the case where a repeating pattern is required to be produced on the fabric the drum 29 is provided in addition to a complete pattern, leading and trailing portions of that pattern which portions are equivalent in length to that of the scanning head and are indicated at 29a and 29b in FIGURE 1.

It will be appreciated that other known ways of scanning the pattern may be employed, for example, instead of the pattern being disposed on the cylinder so that the aforesaid circles 27 represent the width of the carpet they represent the length of the carpet and the axial lines 28 represent the width of the carpet instead of its length. In this case the lens systems 31 and photo-electric cells 32 are disposed apart around the circumference of the cylinder 29 and are rapidly traversed backwardly and forwardly along the length of the cylinder 29 by the transmission 30 while the drum is slowly rotated by the transmission 30 at a speed proportional to speed of travel of the fabric 3.

In either of the above arrangements instead of providing a lens system 31 and associated photo-electric cells 32 for each colour to be reproduced in the carpet there may be employed a known arrangement comprising a single lens system and an associated prism which, as the colour value of the beam from the lens system varies due to the lens system coming opposite different colour tones produces spaced bands in the spectrum beam radiated by the prism according to the prevailing colour tone. Disposed in the spectrum beam are three photo-electric cells responsive to the three primary colours yellow, blue and red and so located that the cell responsive to red is opposite the red portion of the spectrum beam, the yellow opposite the yellow part of the spectrum beam and the blue opposite the blue part of the spectrum beam. The resulting signals, from the red, yellow and blue responsive cells representing the primary colour values are super-imposed on a carrier frequency which is transmitted to a primary splitter having a number of electrical outputs corresponding to the number of different colours which may be required to be reproduced in a tufted fabric. Each of the outputs from the primary splitter is connected to a secondary splitter device having the same number of outputs as there are needles carried by a bar or panel 15 and which outputs are connected through an amplifier to the solenoid 24.

As indicated above the photo-electric cells need only be responsive respectively to the primary colours and should the optical scanner traverse say a green area the photo-electric cells responsive to blue and yellow will be energised simultaneously and blue and yellow signals on the carrier frequency arrive simultaneously at the primary splitter which is arranged to supply an impulse which is transmitted to one of the outputs representing green. On the other hand should at another point of time only a signal resulting from a primary colour be superimposed on the carrier wave it will be transmitted to another output. The primary splitter also functions as the aforesaid instep maintenance device 36. As indicated earlier instead of the electrical impulses from the scanner being transmitted directly to the tufting mechanism they may be stored in a perforated or magnetic tape, for which purpose the conductors 35 from the photo-electric cells 32 may be connected through conductors 44 to a known mechanism 41 either for perforating a tape 42 or for locally magnetising it and this tape may be coiled and stored for future use. When it is required to use the tape, it is placed opposite or in a known form of reproducer 43 which produces electrical impulses similar to that originally produced in the conductors 35 and the outputs from which reproducer is connected through conductors 44a back again to the conductors 35. On the other hand the electrical impulses in the conductors 35 may be stored in the memory of a computer 46 for which purpose the conductors 35 are connected by conductors 47 to the input of the computer and when the computer is required for controlling the tufting mechanism its outputs are connected through conductors 47a, back again to the conductors 35.

As also previously indicated the method of collecting and controlling the needle holders 16 is also applicable to controlling holders for other tools, for example, the same method may be employed for copying coloured pictures and a suitable apparatus for this purpose is diagrammatically illustrated in FIGURE 6. In this case the holders 16 have fixed in their lower ends tubes 50 provided at their lower ends with absorbent pads 51. Each holder is formed with an inlet passage 52 communicating with the tube 50. Each holder in one of the bars 15 projects into a tank 53 containing paint, ink or metal particles in suspension of a colour appropriate to that particular bar 15. The tank may be closed by a lid 54 and the holders may project through suitable glands 55 in the lid. The tubes 50 may similarly project through glands 56 in the bottom of the tank. The lid 54 is provided with a nipple 57 which may be connected by a pipe 68 with a source of pressure 69.

Disposed beneath the various pads 51 is a web 58 on which the picture is to be formed and which is traversed past the pads in a similar manner to the fabric of the tufted fabric. Similarly the movement of the holders 16 are controlled in the manner described with respect to the tufting apparatus.

A similar apparatus may be employed for depositing molten metal on a refractory strip, for example, for producing a printed electric circuit from a pattern in which case the tank 53 may be arranged to control molten metal and is heat insulated and provided with means for maintaining the metal molten, and instead of the tubes being provided with absorbent pads each of them is provided at its lower end with a needle valve 71 (see FIGURE 7) which when contacting with the refractory strip deposits a small quantity of metal thereon and the successive depositions of the metal may join one another so as to form a conductor of the printed circuit. The same method may be employed for cutting or forming perforations in a metal strip by means of spark erosions as shown in FIGURE 8, for which purpose the strip 58 to be cut or perforated is arranged to be traversed from a supply spool 59 into a reservoir 60 containing a fluid such as oil 61 and the strip passes around guide rollers 62 so that it is immersed in the oil and then passes out of the reservoir on to a take-up spool 63. The aforesaid holders 16 carry electrodes 67 and the holders as in the case of the tufting apparatus are reciprocable in the carrying bars or panels 15 but are insulated therefrom and their upper ends are connected to one side of a source of high tension electrical supply whereas the metal strip or the spools therefor are connected to the other side of the source of high tension electrical supply.

The aforesaid drum 29 carries a pattern of cuts or perforations which are required to be formed by the spark erosion process and thus as each electrode approaches the moving strip it will form a hole or cut in the appropriate position.

The oil in the reservoir is not required.

It will be appreciated that many modifications may be made to details of construction without departing from the scope of this invention. For example, instead of reciprocation being imparted to the various tool holders by a single moving element and the holders being selected for tufting by latch means, each holder may be reciprocated by an individual motor which is controlled by signals initiated by the scanner, for example, each motor may comprise a solenoid which is controlled by the aforesaid signal.

In the case where a perforated tape is employed each holder may be provided with a pneumatic motor and is controlled by pulses initiated by the perforated tape traversing a source of pressure.

Alternatively the tape with holes may pass between the number of electric contacts associated with a number of circuits and each needle may be actuated by electromagnetic means.

In the case where magnetic tape is provided responsive means may be magnetic and signals produced may be arranged to actuate one or more electromagnetic activating means associated with the needles.

In certain instances where only a small area of fabric is to be tufted the fabric may be stationary in the apparatus and the rows of needles traversed over it. Also, as shown in imparting reciprocatory movement to the needles with respect to the fabric, movement may be imparted to the fabric towards and away from the needles.

We claim:
1. An apparatus for operating on material in accordance with a predetermined programme comprising
 (a) a support frame,
 (b) a number of rows of tool holders,
 (c) means to mount the tool holders on the frame for movement between operative and inoperative positions,
 (d) means to move material to be operated upon along a path extending transversely of said rows of tool holders,
 (e) means for reciprocating the frame towards and away from said path of the material,
 (f) means for moving all the tool holders into said operative positions during movement of the frame away from the path of the material,
 (g) separate solenoid operated latch means on the frame for each tool holder operable to hold the tool holders in operative position and to release the respective tool holders to inoperative position,
 (h) a programmer for conditioning the said latch means each time all the tool holders are moved into operative positions so that selected tool holders are maintained in operative positions for a reciprocation of the frame towards and away from the material, and
 (i) means for returning all the non-selected tool holders to inoperative positions when the tool holders are disengaged from said means for moving them into operative positions.

2. An apparatus according to claim 1 wherein said means for returning all the non-selected tool holders to inoperative positions comprise resilient means for each of the tool holders acting between the tool holders and the frame and arranged to urge the tool holders towards said inoperative positions.

3. An apparatus as claimed in claim 1 wherein the frame is provided with a number of locating means spaced apart in the direction of said paths of travel of the material each of which locating means receives a bar in which a row of said tool holders are reciprocably mounted.

4. An apparatus according to claim 1 wherein each tool holder has spaced stops for limiting its movement with respect to the frame, a notch in one side thereof for engagement with said latch means and spring means acting between the tool holder and the frame to urge the tool holder towards the inoperative position, and a fixed abutment is provided above each row of tools holders for engagement with the tool holders when the frame is moved away from the path of travel of the backing and to move the tool holders with respect to the frame to said operative positions.

5. An apparatus according to claim 1 for manufacturing tufting materials wherein tufting needles are mounted in said holders and the movement of the frame towards the path of travel of the backing moves the operative holders for the needles sufficiently to bring yarns in the needles opposite means adapted to engage the yarn so that when the frame moves away from the path of travel of the backing loops are formed in the material.

6. An apparatus according to claim 5 wherein the reciprocal movement of the frame towards the path of travel of the material brings the needles in the inoperative tools into positions in which they can pierce the material but stop short of the means for engaging the yarn.

7. An apparatus as claimed in claim 1 wherein said programmer comprises a pattern representing the material in its required finished form and a scanner which traverses the pattern in a direction corresponding to the direction in which the tool holders extend across the material thereby producing a succession of signals and said latch means have means controlled by said scanner to render them operative in accordance with the pattern traversed by the scanner.

8. An apparatus according to claim 7 wherein said scanner is connected to a computer or magnetic or perforated tape with which are associated means for subsequently controlling said means for rendering the latch means operative.

9. An apparatus according to claim 6 wherein the scanner is of the optical kind.

10. An apparatus according to claim 9 wherein means are provided for converting the light signals resulting from the optical scanner into electrical signals and said means for operating the latch means comprise solenoids.

11. Apparatus according to claim 1 wherein said programmer comprises a computer which is adapted to be conditioned in accordance with a required finish to be applied to the material by said tools so as to generate a succession of signals which control said latch means.

References Cited

UNITED STATES PATENTS

| 1,510,246 | 9/1924  | Sharaf     | 112—79 X |
| 1,830,463 | 11/1931 | Foster     | 112—79   |
| 1,984,330 | 12/1934 | Boyce      | 112—79 X |
| 2,768,593 | 10/1952 | Lombard    | 112—79   |
| 2,989,014 | 6/1961  | Dedmon     | 112—79   |
| 3,160,125 | 12/1964 | Bryant     | 112—79   |
| 3,172,380 | 3/1965  | Boyles     | 112—79   |
| 3,247,815 | 4/1966  | Polevitzky | 112—79   |

FOREIGN PATENTS 404,070   5/1943   Italy.

HERBERT F. ROSS, Primary Examiner

U.S. Cl. X.R.

112—221